US007629715B1

(12) United States Patent
Sortore et al.

(10) Patent No.: US 7,629,715 B1
(45) Date of Patent: Dec. 8, 2009

(54) SYSTEMS, DEVICES AND METHODS FOR DRIVING MACHINERY

(75) Inventors: Christopher Sortore, Roanoke, VA (US); Robert Jett Field, Fincastle, VA (US); Victor Iannello, Roanoke, VA (US)

(73) Assignee: Synchrony, Inc., Salem, VA (US)

( * ) Notice: Subject to any disclaimer, the term of this patent is extended or adjusted under 35 U.S.C. 154(b) by 534 days.

(21) Appl. No.: 11/442,829

(22) Filed: May 30, 2006

Related U.S. Application Data

(60) Provisional application No. 60/685,792, filed on May 31, 2005.

(51) Int. Cl.
*H02K 9/00* (2006.01)
*H02K 9/20* (2006.01)
*H02K 5/00* (2006.01)
(52) U.S. Cl. .............................. 310/54; 310/89; 310/52
(58) Field of Classification Search .................. 310/90, 310/95.5, 54, 89, 52
See application file for complete search history.

(56) References Cited

U.S. PATENT DOCUMENTS

| | | | | | |
|---|---|---|---|---|---|
| 4,389,849 | A | * | 6/1983 | Beggs et al. | 62/6 |
| 4,650,132 | A | * | 3/1987 | Graf et al. | 242/484.6 |
| 5,256,638 | A | | 10/1993 | Weinberger | |
| 6,198,183 | B1 | * | 3/2001 | Baeumel et al. | 310/52 |
| 6,309,188 | B1 | | 10/2001 | Danner | |
| 6,777,841 | B2 | | 8/2004 | Steinmeyer | |
| 7,002,273 | B2 | | 2/2006 | Schippl | |
| 2003/0132673 | A1 | | 7/2003 | Zhou | |
| 2004/0046467 | A1 | | 3/2004 | Huang | |
| 2007/0200438 | A1 | * | 8/2007 | Kaminski et al. | 310/54 |

* cited by examiner

*Primary Examiner*—Quyen Leung
*Assistant Examiner*—Leda Pham
(74) *Attorney, Agent, or Firm*—Michael Haynes PLC; Michael N. Haynes

(57) ABSTRACT

Certain exemplary embodiments can comprise a system comprising a channel adapted to guide a coolant, the channel bounded at least in part by an inner channel wall defined by a motor housing adapted to substantially surround a stator of an electric motor, the inner channel wall adapted to conduct, to the coolant, heat generated by the stator.

24 Claims, 3 Drawing Sheets

SYSTEMS, DEVICES AND METHODS FOR DRIVING MACHINERY

CROSS-REFERENCES TO RELATED APPLICATIONS

This application claims priority to, and incorporates by reference herein in its entirety, pending U.S. Provisional Patent Application Ser. No. 60/685,792, filed 31 May 2005.

BRIEF DESCRIPTION OF THE DRAWINGS

A wide variety of potential practical and useful embodiments will be more readily understood through the following detailed description of certain exemplary embodiments, with reference to the accompanying exemplary drawings in which.

DEFINITIONS

Figure 1:
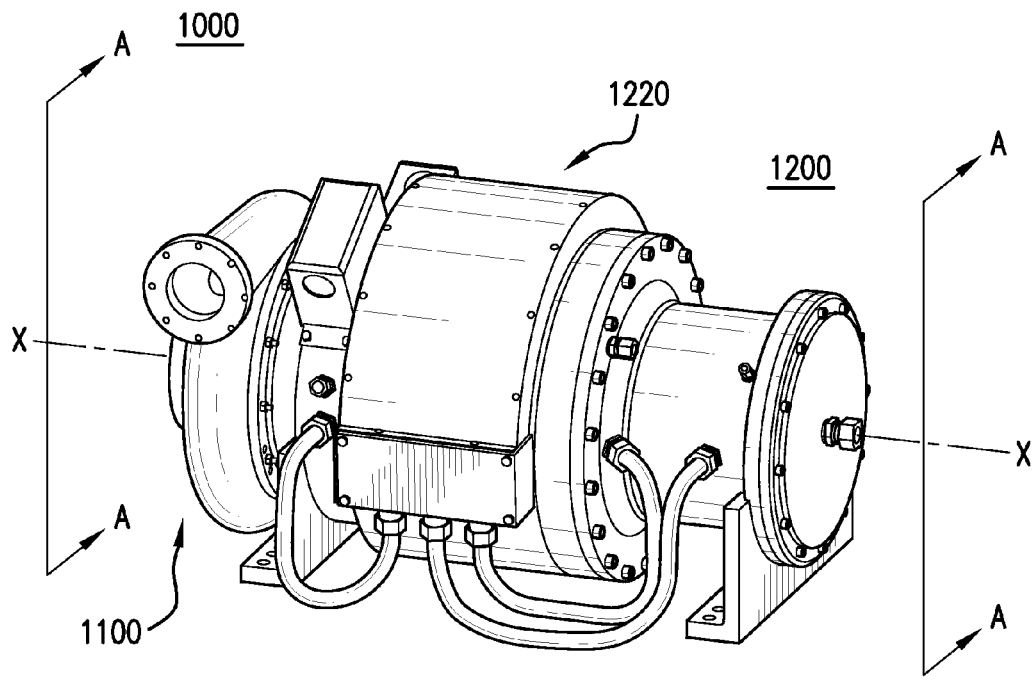
FIG. 1 is a perspective view of an exemplary embodiment of a system 1000.

When the following terms are used substantively herein, the accompanying definitions apply. These terms and definitions are presented without prejudice, and, consistent with the application, the right to redefine these terms during the prosecution of this application or any application claiming priority hereto is reserved. For the purpose of interpreting a claim of any patent that claims priority hereto, each definition (or redefined term if an original definition was amended during the prosecution of that patent), functions as a clear and unambiguous disavowal of the subject matter outside of that definition.

about—around.
actively—via converting and/or amplifying voltages and/or currents, such as via a diode and/or transistor.
adapted—suitable, fit, and/or capable of performing a specified function.
adjust—to change so as to match, fit, adapt, conform, and/or be in a more effective state.
adjust—to change, modify, adapt, and/or alter.
approximately—about and/or nearly the same as.
approximately—nearly the same as.
at least—not less than.
baffle—a usually static, but potentially movable, device that regulates the flow of a fluid.
bearing—a device that supports, guides, and reduces the friction of motion between fixed and moving machine parts.
bound—to limit an extent.
channel—a defined passage, conduit, and/or groove for conveying one or more fluids.
circuit—a communications connection established across two or more switching devices comprised by a network and between corresponding end systems connected to, but not comprised by the network. The sequence of links spanned by the circuit is called its service (or working) route (or path). If there is a failure in the network affecting one or more of the links or switches in the service route of the circuit, then the circuit fails as well. In this case, the circuit can be re-routed on a new restoration route that avoids the failed portions of the network. When the failure is repaired, the circuit can be reverted back to its original service route.
circuit—an electrically conducting pathway.
circulate—to repeatedly move in or flow through a closed path.
commutate—to reverse the direction of (an alternating electric current) each half-cycle to produce a unidirectional current.
compressor—a machine that decreases the volume of air and/or other gas by the application of pressure.
comprised—included; a part of.
comprises—includes, but is not limited to, what follows.
comprising—including but not limited to, what follows.
conduct—to act as a medium for conveying something such as heat and/or electricity.
control—to exercise authoritative and/or dominating influence over; cause to act in a predetermined manner; direct; adjust to a requirement; and/or regulate.
coolant—a material adapted to transfer heat from a body.
damping—an effect, either deliberately engendered and/or inherent to a system, that tends to reduce the amplitude of oscillations.
define—to establish the meaning, relationship, outline, form, and/or structure of.
directly—without anything intervening.
electric motor—a motion-imparting device powered by electricity.
electronic—digitally processed, stored, and/or transmitted.
electronic circuit board—a thin substantially planar board to which electronic components are fixed, typically by solder. Component leads and integrated circuit pins can pass through holes ("vias") in the board and/or they can be surface mounted, in which case no holes are required (although they can still be used to interconnect different layers of the board).
energy—usable power.
fan—a device for creating a flow of a vapor via the rotational movement of typically thin, rigid vanes.
flow—a continuous transfer.
from—used to indicate a source.
further—in addition.
generate—to create, produce, render, give rise to, and/or bring into existence.
greater—larger and/or more than.
guide—to direct, steer, and/or exert control and/or influence over.
heat—energy associated with the motion of atoms and/or molecules and capable of being transmitted through solid and fluid media by conduction, through fluid media by convection, and through a fluid and/or empty space by radiation.
heat exchanger—a device used to transfer heat from a first fluid on one side of a barrier to a second fluid on the other side without bringing the first fluid and the second fluid into direct contact with each other.
housing—something that covers, encloses, protects, holds, and/or supports, such as a frame, box, and/or chassis.
impeller—a rotating device used to force a fluid and/or material motion in a desired direction.
in part—partially.
inner—closer than another to the center and/or middle.
levitate—to rise, suspend, and/or float, and/or to cause to rise, suspend, and/or float, as if lighter than a surrounding medium.

liquid—a body of matter that exhibits a characteristic readiness to flow, little or no tendency to disperse, and relatively high incompressibility.

longitudinal axis—a straight line defined parallel to an object's length and passing through a centroid of the object.

machine—a device and/or vehicle adapted to perform at least one task.

magnetic—having the property of attracting iron and certain other materials by virtue of a surrounding field of force.

mechanically coupled—at least a first object and a second object joined, connected, and/or linked so as to allow the first object to move physically in concert with the second object.

motor—an electric, hydraulic, and/or pneumatic device that produces or imparts linear and/or angular motion.

multiple—more than one.

non—not.

not—a negation of something.

operating—functioning.

outer—farther than another from the center and/or middle.

positioned—to put in place or position.

pump—a machine adapted to raise, compress, and/or transfer a fluid.

remove—to eliminate, remove, and/or delete, and/or to move from a place or position occupied.

rotate—to turn about an axis.

rotation—an act and/or process of turning around a center and/or an axis.

rotational—about and/or around an axis.

said—when used in a system or device claim, an article indicating a subsequent claim term that has been previously introduced.

shaft—a long, generally cylindrical bar that is adapted to rotate about a longitudinal axis and to transmit power.

stator—a stationary part in or about which another part (the rotor) revolves.

stiffness—the resistance of an elastic body to deflection by an applied force.

substantially—to a considerable, large, and/or great, but not necessarily whole and/or entire, extent and/or degree.

support—to bear the weight of, especially from below.

surround—to encircle, enclose, and/or confine on several and/or all sides.

system—a collection of mechanisms, devices, data, and/or instructions, the collection designed to perform one or more specific functions.

turbine—any of various machines in which the kinetic energy of a moving fluid is converted to mechanical power by the impulse or reaction of the fluid with a series of buckets, paddles, and/or blades arrayed about the circumference of a wheel and/or cylinder.

wall—a partition, structure, and/or mass that serves to enclose, divide, separate, segregate, define, and/or protect a volume and/or to support a floor, ceiling, and/or another wall.

when—at a time.

wherein—in regard to which; and; and/or in addition to.

DETAILED DESCRIPTION

Certain exemplary embodiments relate to a magnetically-supported, oil-free, electric drive train for rotating machinery. The electronics for the magnetic bearings and the electric motor can be mechanically and/or thermally integrated with the rotating machine, potentially reducing the size, the amount of electric wiring, and/or the complexity of the drive train.

Electric drive trains can provide the torque to spin compressors, pumps, and/or spindles, where rotational speeds between 20,000 and 100,000 rpm can occur. Typically, an electric motor spins at some speed less than 3,600 rpm, and a gear box increases this rotational speed to the higher speed required by the machine. However, the gear box can:

require oil lubrication;
be large and expensive;
require maintenance; and/or
limit the life of the machine.

By mounting a high speed electric motor on the same shaft as the rotating machine, the machine can be directly driven without the need for a gear box. The shaft can be supported and/or positioned on active magnetic bearings, which can offer:

elimination of oil lubrication;
low frictional losses; and/or
long life due to the elimination of mechanical wear.

Although it can be possible to use passive magnetic bearings to support the rotating shaft, passive bearings can offer low stiffness and/or damping, and therefore are not broadly used. Active magnetic bearings can achieve high stiffness and/or damping through electronic feedback, in which electronic components sense the position of the shaft, process these position signals, and control the electrical currents of electromagnets in the magnetic bearing. The additional electronics used for active control are typically located in a separate enclosure that is neither mechanically nor thermally integrated with the machine.

In certain exemplary embodiments, the electronics for the magnetic bearings and/or electric motor can be mechanically and/or thermally integrated into the machine. This can offer any of the following benefits:

no need for an external enclosure for the control electronics;
no need for cabling between the machine and the control electronics;
the motor, machine, and/or control electronics can share the same heat sink, simplifying the thermal design; and/or
packaging of the electric drive train can be improved, reducing the overall size and weight.

FIG. 1 is a perspective view of an exemplary embodiment of a system 1000, which can be a compressor assembly, comprising a compressor 1100 and a motor 1200, and defining a longitudinal axis X-X. Covering control electronic circuit boards of motor 1200 can be a control electronics cover 1220.

Figure 2:
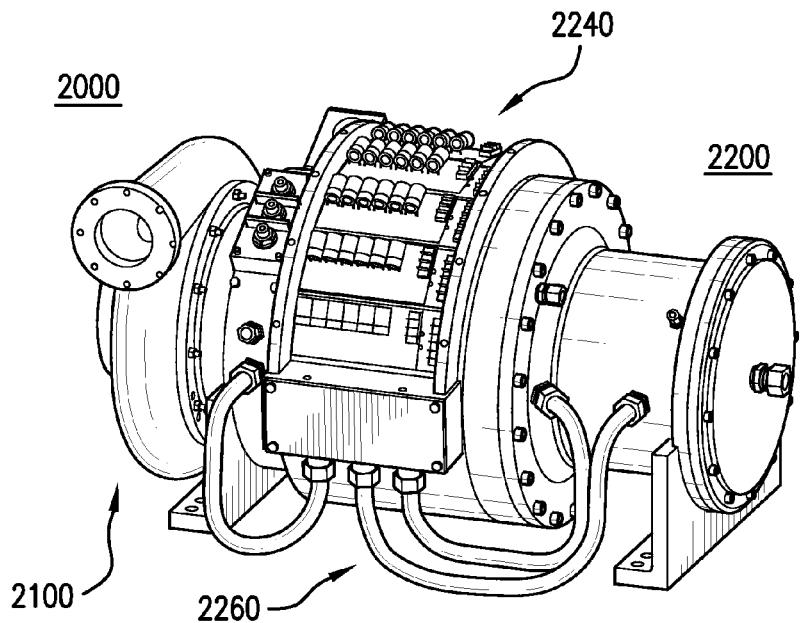
FIG. 2 is a perspective view of an exemplary embodiment of a system 2000.

FIG. 2 is a perspective view of an exemplary embodiment of a system 2000, which can be a compressor assembly, comprising a compressor 2100 and a motor 2200. A control electronics cover has been removed to show control electronic circuit boards 2240, which can be located and/or mounted on and/or to the housing of motor 2200. By mounting these electronics adjacent the housing, the electronics can be accessible yet the external wiring can be eliminated.

Tubing 2260 can guard electrical conductors that connect the control electronics 2240 to other components of motor 2200. For example, tubing 2260 can be used to pass the electrical wires for the magnetic bearing coils and sensor to a sealed box. In this way, no hermetic feedthroughs are used on the housing for these wires.

Figure 3:
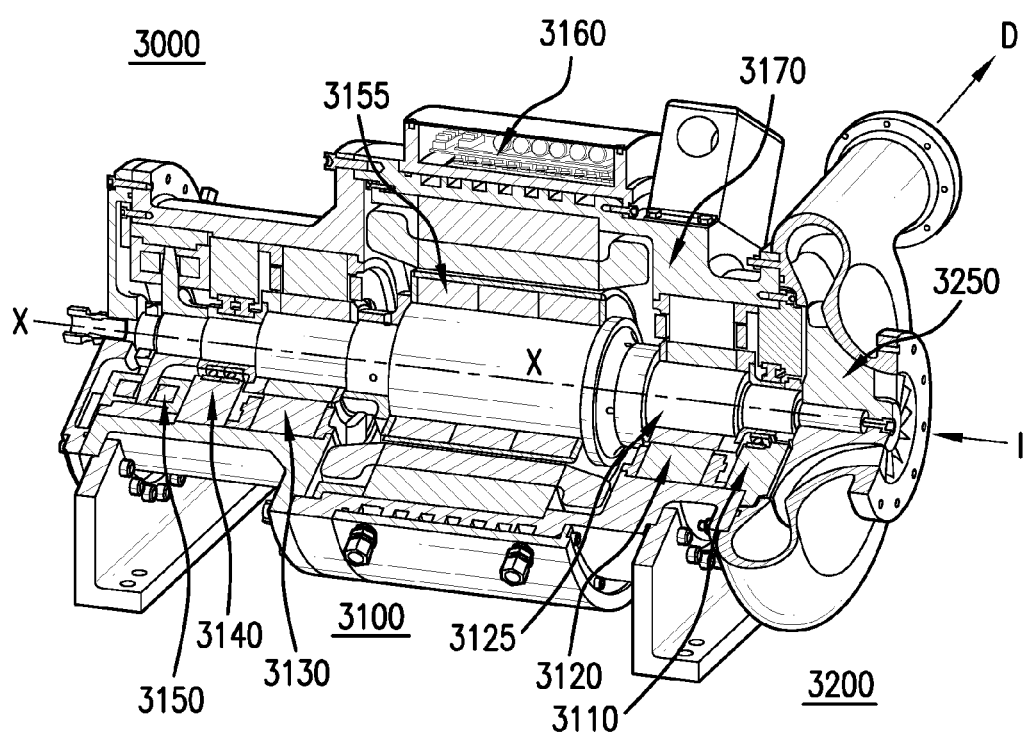
FIG. 3 is a cut-away perspective view of an exemplary embodiment of a system 3000.

FIG. 3 is a cut-away perspective view of an exemplary embodiment of a system 3000, which can be a rotating machine assembly and/or a compressor assembly, comprising a compressor 3200 that is directly mechanically coupled to a motor 3100, which can define a longitudinal axis X-X about which at least a portion of motor 3100 and/or compressor 3200 can rotate. A fluid can enter compressor 3200 axially at inlet I, be compressed by impeller 3250, and/or exit compressor 3200 at discharge D.

Motor 3100 can comprise a longitudinally-extending shaft 3125, which can be supported and/or restrained by back-up bearings 3110, 3140; radial magnetic bearings 3120, 3130; and/or thrust bearing 3150. Non-magnetic backup bearings 3110, 3140 can be included to support the shaft when the magnetic bearings 3120, 3130 are not operating. The gap between the rotating shaft and the backup bearing is typically about one-half the gap between the stator and rotor of the magnetic bearing so that mechanical contact between the stator and rotor of the magnetic bearing does not normally occur. For some applications, the backup bearing can take the form of a bushing or sleeve. For higher speed applications, the backup bearing can be a rolling element bearing such as a ball bearing. Because of the gap between the inner race of the ball bearing and the shaft, the ball bearing typically would not spin unless contact occurs.

Mounted on and/or integral to shaft 3125 can be a motor rotor 3155, which can be surrounded by a housing 3170. Mounted to and/or on housing 3170 can be control electronic circuit boards 3160, which can comprise one or more electronic circuit boards comprised by a magnetic bearing control system that is adapted to control a stiffness and/or damping of the magnetic bearings.

Although in FIG. 3, a single impeller 3250 is shown mounted at one end of the shaft 3125, it is possible to construct a machine with multiple impellers. These additional impellers can be mounted on either end of the shaft. The flow path for the additional impellers can be cascaded in a multi-stage arrangement and/or the flow paths can be in parallel.

Although a centrifugal compressor is shown in FIG. 3 in which the flow enters the impeller axially and leaves radially, other types of compressors, pumps, turbines, and/or fans, etc., are possible in which the flow enters and/or exits the stage either predominantly radially, predominantly axially, or some combination of radially and axially. If there is a turbine stage on the shaft, the electric motor can act as an electric generator, in which shaft power is extracted and converted to electrical power by the electronics.

Certain exemplary embodiments can be used as a high speed spindle for grinders and/or other metal cutting machines; for turntables used in semiconductor manufacturing; for precision spindles where only a very low level of runout is acceptable; and/or for other applications requiring very precise control of a rotating shaft. For these applications, the impeller and casing of the impeller can be replaced with hardware onto which a cutting tool, turntable, and/or other device can be attached to the shaft.

Figure 4:
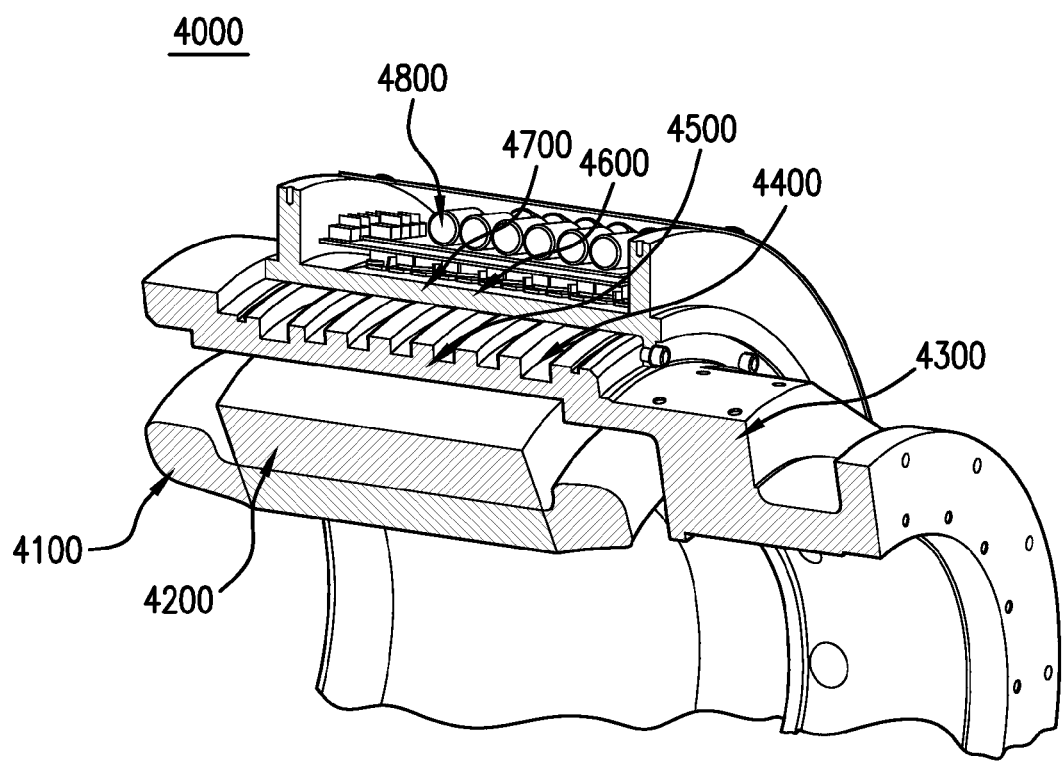
FIG. 4 is a perspective view of an exemplary embodiment of a system 4000.

FIG. 4 is a perspective view of an exemplary embodiment of a system 4000, which can comprise motor windings 4100 and/or a stator 4200. Surrounding windings 4100 and/or stator 4200 can be a housing 4300. One or more channels, grooves, and/or passages 4400 can be formed at least in part by and/or in housing 4300. For example, housing 4300 can comprise an inner wall 4500 of channels 4400. An outer wall 4700 of channels 4400 can be formed by a mounting collar 4600 and/or by housing 4300. Heat generated by the motor, windings 4100, and/or stator 4200 can be conducted through inner channel wall 4500 to a coolant and/or heat transfer liquid and/or fluid circulating through channels 4400. Heat generated by control electronic circuit boards 4800 can be conducted through outer channel wall 4700 to the same liquid circulating through channels 4400.

Energy to convey the heat transfer fluid can be provided by a pump. Heat absorbed by the fluid can be transferred out of the fluid via a heat exchanger.

Fluid flow can be controlled, directed, and/or guided via the channel(s) and/or via one or more baffles positioned in, upstream of, and/or downstream of the channel(s).

Thus, in certain exemplary embodiments, the electronics for controlling performance (e.g., stiffness, damping, etc.) of the magnetic bearings and/or the rotation (e.g., direction, speed, etc.) of the electric motor can be integrated with the electric motor. The coolant, which can be liquid, can flow through helical channels that are machined into the housing. The outer diameter of these helical channels can be sealed by a mounting collar, which can have a circular inner diameter and/or can have flats (facets) machined into its outer surface. The flats on the outer surface of the mounting collar can allow flat circuit boards to be mounted thereto. At the inner diameter of these helical channels, heat can be removed from the motor through the housing. At the outer diameter of these helical channels, heat can be removed from the electronics through the mounting collar.

Because of the high rotational speeds and the typical need for the drive train to exhibit long life for many applications, a brushless (electronically commutated) motor can be used. Two possible candidates for this motor are permanent magnet motors and switched-reluctance motors. Both of these motor types can operate at high rotational speeds and/or at high efficiencies.

For a large electric motor, it might not be possible to mount all the circuit boards for control of the electric motor on the machine due to the size and number of circuit boards that might be required. Thus, in certain exemplary embodiments, one or more of the electronic circuit boards for the magnetic bearings and or the electronic circuit boards for the electric motor can be mounted in a separate enclosure.

Although the coolant channels are shown as helical grooves, other geometries are possible in which the coolant flows in an approximately annular and/or longitudinally-extending space between the housing and the mounting collar, and/or within the housing, along a path other than helical. The coolant space might or might not have baffles to optimally guide the flow of the coolant. The coolant can enter and/or exit anywhere along the axial length of this coolant space, including the ends and the middle.

Although the helical grooves for the coolant channels are shown machined into the housing and the mounting collar serves to seal the channels at their outer diameter, the helical grooves alternatively can be machined into the mounting collar and the housing can seal the channels at their inner diameter.

Although the wiring between the magnetic bearing(s) and the electronic circuit boards is shown to pass through tubes that are connected to a sealed box, in some applications it can be desirable to use hermetic feedthroughs as the wire exits the housing, eliminating the tube and the sealed box.

Although the electric drive train is shown with its shaft oriented horizontally, the shaft can be oriented vertically.

Thus, certain exemplary embodiments can comprise a system comprising a channel adapted to guide a coolant, the channel bounded at least in part by an inner channel wall defined by a motor housing adapted to substantially surround a stator of an electric motor, the inner channel wall adapted to conduct, to the coolant, heat generated by the stator. The channel can be bounded at least in part by an outer channel wall adapted to conduct, to the coolant, heat generated by an electronic circuit board comprised by a bearing control system. The bearing control system can be adapted to actively control a magnetic bearing adapted to levitate a shaft of the electric motor. The electric motor can be adapted to be directly mechanically coupled to a rotating machine. The shaft can comprise a longitudinal axis about which the shaft is adapted to rotate.

Note

Still other practical and useful embodiments will become readily apparent to those skilled in this art from reading the above-recited detailed description and drawings of certain exemplary embodiments. It should be understood that numerous variations, modifications, and additional embodiments are possible, and accordingly, all such variations, modifications, and embodiments are to be regarded as being within the spirit and scope of this application.

Thus, regardless of the content of any portion (e.g., title, field, background, summary, abstract, drawing figure, etc.) of this application, unless clearly specified to the contrary, such as via an explicit definition, assertion, or argument, with respect to any claim, whether of this application and/or any claim of any application claiming priority hereto, and whether originally presented or otherwise:

there is no requirement for the inclusion of any particular described or illustrated characteristic, function, activity, or element, any particular sequence of activities, or any particular interrelationship of elements;

any elements can be integrated, segregated, and/or duplicated;

any activity can be repeated, performed by multiple entities, and/or performed in multiple jurisdictions; and any activity or element can be specifically excluded, the sequence of activities can vary, and/or the interrelationship of elements can vary.

Moreover, when any number or range is described herein, unless clearly stated otherwise, that number or range is approximate. When any range is described herein, unless clearly stated otherwise, that range includes all values therein and all subranges therein. For example, if a range of 1 to 10 is described, that range includes all values therebetween, such as for example, 1.1, 2.5, 3.335, 5, 6.179, 8.9999, etc., and includes all subranges therebetween, such as for example, 1 to 3.65, 2.8 to 8.14, 1.93 to 9, etc.

Any information in any material (e.g., a. United States patent, United States patent application, book, article, etc.) that has been incorporated by reference herein, is only incorporated by reference to the extent that no conflict exists between such information and the other statements and drawings set forth herein. In the event of such conflict, including a conflict that would render invalid any claim herein or seeking priority hereto, then any such conflicting information in such incorporated by reference material is specifically not incorporated by reference herein.

Accordingly, the descriptions and drawings are to be regarded as illustrative in nature, and not as restrictive.

What is claimed is:

1. A system comprising:
an electric motor adapted to be directly mechanically coupled to a rotating machine, said electric motor comprising a longitudinal axis about which a shaft of said motor is adapted to rotate, said electric motor comprising:
a bearing control system adapted to actively control a magnetic bearing adapted to levitate said shaft, said bearing control system comprising an electronic circuit board;
a liquid coolant channel adapted to guide a liquid coolant, said liquid coolant channel bounded at least in part by:
an inner channel wall defined by a motor housing adapted to substantially surround a stator of said electric motor, said inner channel wall adapted to conduct, to said liquid coolant, heat generated by said stator; and
an outer channel wall adapted to conduct, to said liquid coolant, heat generated by said electronic circuit board, said outer channel wall further adapted to substantially circumferentially surround said liquid coolant channel.

2. The system of claim 1, wherein:
said bearing control system is adapted to adjust a stiffness of said magnetic bearing.

3. The system of claim 1, wherein:
said bearing control system is adapted to adjust a damping of said magnetic bearing.

4. The system of claim 1, wherein:
said outer channel wall adapted to conduct, to said liquid coolant, heat generated by an electronic circuit board comprised by a rotational control system adapted to control rotation of said shaft.

5. The system of claim 1, wherein:
said motor is electronically commutated.

6. The system of claim 1, wherein:
said shaft is adapted to rotate approximately 20,000 revolutions per minute or greater.

7. The system of claim 1, further comprising:
said magnetic bearing.

8. The system of claim 1, further comprising:
a non-magnetic bearing adapted to support said shaft when said magnetic bearing is not operating.

9. The system of claim 1, further comprising:
said stator.

10. The system of claim 1, further comprising:
said rotating machine.

11. The system of claim 1, wherein:
said rotating machine is a compressor.

12. The system of claim 1, wherein:
said rotating machine comprises multiple impellers.

13. The system of claim 1, wherein:
said rotating machine is a fan.

14. The system of claim 1, wherein:
said rotating machine is a turbine.

15. The system of claim 1, wherein:
said rotating machine is a pump.

16. The system of claim 1, further comprising:
a baffle adapted to be positioned in said liquid coolant channel and adapted to guide flow of said liquid coolant.

17. The system of claim 1, further comprising:
a pump adapted to circulate said liquid coolant.

18. The system of claim 1, further comprising:
a heat exchanger adapted to remove heat from said liquid coolant.

19. A system comprising:
an electronic circuit board comprised by a bearing control system, said bearing control system adapted to actively control a magnetic bearing adapted to levitate a shaft of an electric motor adapted to be directly mechanically coupled to a rotating machine, said shaft comprising a longitudinal axis about which said shaft is adapted to rotate; and
a liquid coolant channel adapted to guide a liquid coolant, said liquid coolant channel bounded at least in part by:

an inner channel wall defined by a motor housing adapted to substantially surround a stator of said electric motor, said inner channel wall adapted to conduct, to said liquid coolant, heat generated by said stator; and an outer channel wall adapted to conduct, to said liquid coolant, heat generated by said electronic circuit board, said outer channel wall further adapted to substantially circumferentially surround said liquid coolant channel.

20. A system comprising:

a liquid coolant channel adapted to guide a liquid coolant, said liquid coolant channel bounded at least in part by:

an inner channel wall defined by a motor housing adapted to substantially surround a stator of an electric motor, said inner channel wall adapted to conduct, to said liquid coolant, heat generated by said stator; and an outer channel wall adapted to conduct, to said liquid coolant, heat generated by an electronic circuit board comprised by a bearing control system, said outer channel wall further adapted to substantially circumferentially surround said liquid coolant channel, said bearing control system adapted to actively control a magnetic bearing adapted to levitate a shaft of said electric motor, said electric motor adapted to be directly mechanically coupled to a rotating machine, said shaft comprising a longitudinal axis about which said shaft is adapted to rotate.

21. The system of claim 1, wherein:
said liquid coolant channel is substantially helical in shape.

22. The system of claim 1, wherein:
said liquid coolant channel is adapted to induce a substantially helical flow pattern in said liquid coolant.

23. The system of claim 1, wherein:
said liquid coolant channel is substantially helical in shape and machined into said inner channel wall.

24. The system of claim 1, wherein:
said liquid coolant channel is substantially helical in shape and sealed by a mounting collar comprising said outer channel wall.

* * * * *

UNITED STATES PATENT AND TRADEMARK OFFICE
CERTIFICATE OF CORRECTION

PATENT NO. : 7,629,715 B1  Page 1 of 1
APPLICATION NO. : 11/442829
DATED : December 8, 2009
INVENTOR(S) : Sortore et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 726 days.

Signed and Sealed this

Second Day of November, 2010

David J. Kappos
*Director of the United States Patent and Trademark Office*